(12) United States Patent
Hashizume et al.

(10) Patent No.: US 12,493,119 B2
(45) Date of Patent: Dec. 9, 2025

(54) DETECTION DEVICE

(71) Applicants: HONDA MOTOR CO., LTD., Tokyo (JP); NIDEC ELESYS CORPORATION, Kawasaki (JP)

(72) Inventors: Takashi Hashizume, Wako (JP); Makoto Yazaki, Wako (JP); Daisuke Nojiri, Wako (JP); Yuichi Nakamura, Kawasaki (JP)

(73) Assignees: HONDA MOTOR CO., LTD., Tokyo (JP); NIDEC ELESYS CORPORATION, Kanagawa (JP)

( * ) Notice: Subject to any disclaimer, the term of this patent is extended or adjusted under 35 U.S.C. 154(b) by 253 days.

(21) Appl. No.: 18/181,850

(22) Filed: Mar. 10, 2023

(65) Prior Publication Data

US 2023/0324546 A1 Oct. 12, 2023

(30) Foreign Application Priority Data

Mar. 15, 2022 (JP) .................. 2022-039926

(51) Int. Cl.
*G01S 13/937* (2020.01)
*B63B 49/00* (2006.01)
*G01S 7/40* (2006.01)
*G01S 13/08* (2006.01)
*G01S 13/86* (2006.01)

(52) U.S. Cl.
CPC ............ *G01S 13/937* (2020.01); *B63B 49/00* (2013.01); *G01S 7/4004* (2013.01); *G01S 13/08* (2013.01); *G01S 13/867* (2013.01)

(58) Field of Classification Search
None
See application file for complete search history.

(56) References Cited

U.S. PATENT DOCUMENTS 10,254,767 B1\* 4/2019 Kamon .................. B64U 70/97
10,324,468 B2\* 6/2019 Arbuckle ................ B63B 79/20

FOREIGN PATENT DOCUMENTS

JP 5873676 B2 3/2016

\* cited by examiner

*Primary Examiner* — Isam A Alsomiri
(74) *Attorney, Agent, or Firm* — Rankin, Hill & Clark LLP

(57) ABSTRACT

A detection device is provided on a ship and detects a predetermined range positioned in front of the ship, the detection device being provided on a structure erected above a deck of the ship and being provided on a part positioned on a side of a bow of the structure.

8 Claims, 6 Drawing Sheets

DETECTION DEVICE

INCORPORATION BY REFERENCE

The present application claims priority under 35 U.S.C. § 119 to Japanese Patent Application No. 2022-039926 filed on Mar. 15, 2022. The content of the application is incorporated herein by reference in its entirety.

BACKGROUND OF THE INVENTION

Field of the Invention

The present invention relates to a detection device.

Description of the Related Art

Conventionally, there has been a detection device such as a radar device including a radar reference azimuth correction device which corrects a reference azimuth that is a reference of a detection direction of the radar device (for example, Japanese Patent No. 5873676). Some of such detection devices are provided on a bow of a ship and detect an object in front of the ship.

However, when the detection device is provided on the bow in the conventional manner, there is a risk that arrangement position aberration, breakage and dirt adhesion of the detection device are caused by vibrations and splashes or the like accompanying navigation and docking/undocking of a ship, such that a detection function declines.

The present invention provides a detection device capable of suppressing decline of the detection function.

SUMMARY OF THE INVENTION

The present invention aspect is a detection device which is provided on a ship and detects a predetermined range positioned in front of the ship, the detection device being provided on a structure erected above a deck of the ship and being provided on a part positioned on a bow side of the structure.

According to the present invention aspect, decline of a detection function can be suppressed.

DETAILED DESCRIPTION OF THE PREFERRED EMBODIMENT

Hereinafter, the embodiment of the present invention will be explained with reference to the drawings.

Figure 1:
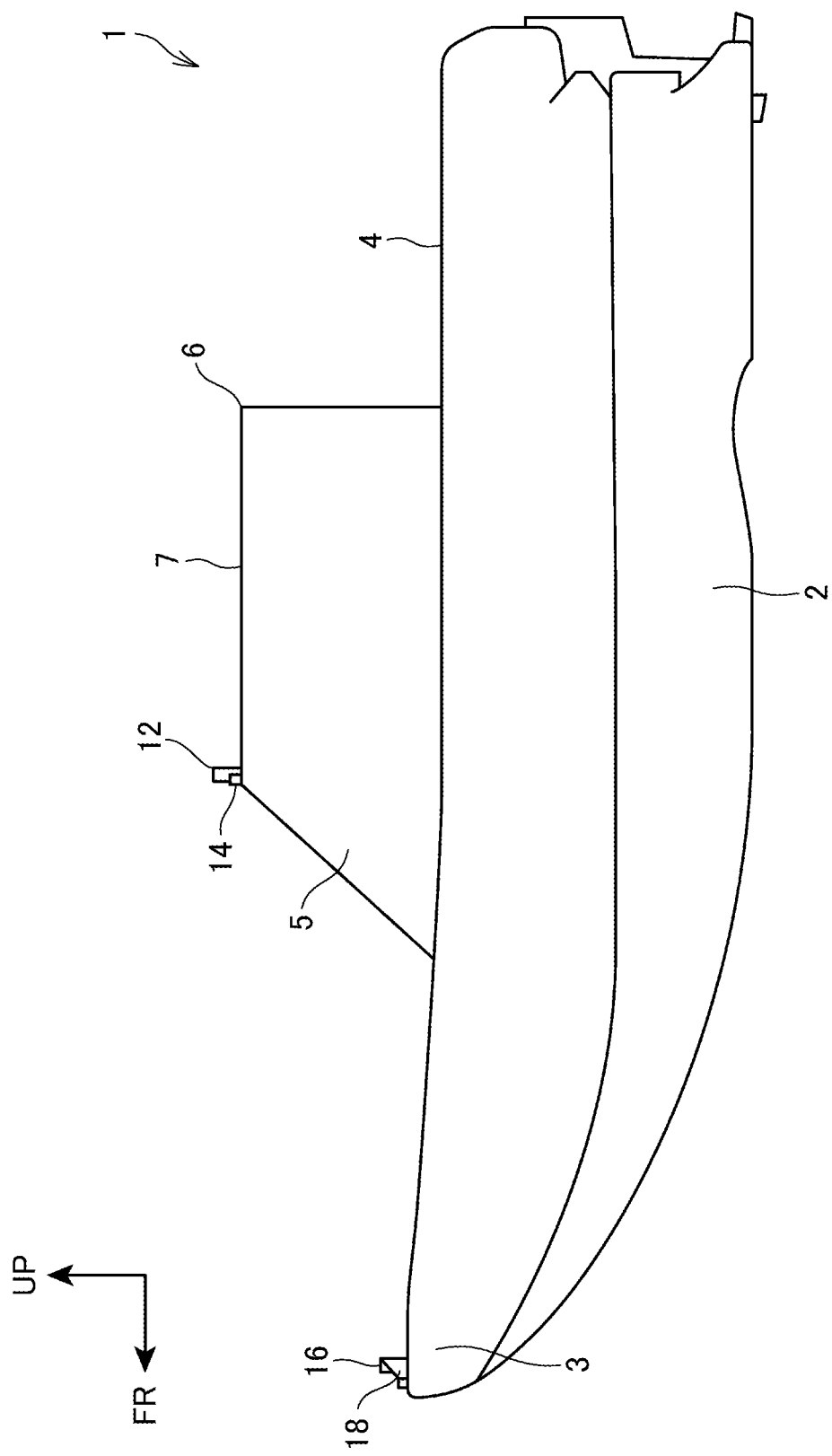
FIG. 1 is a side view of a ship relating to a present embodiment.
Figure 2:
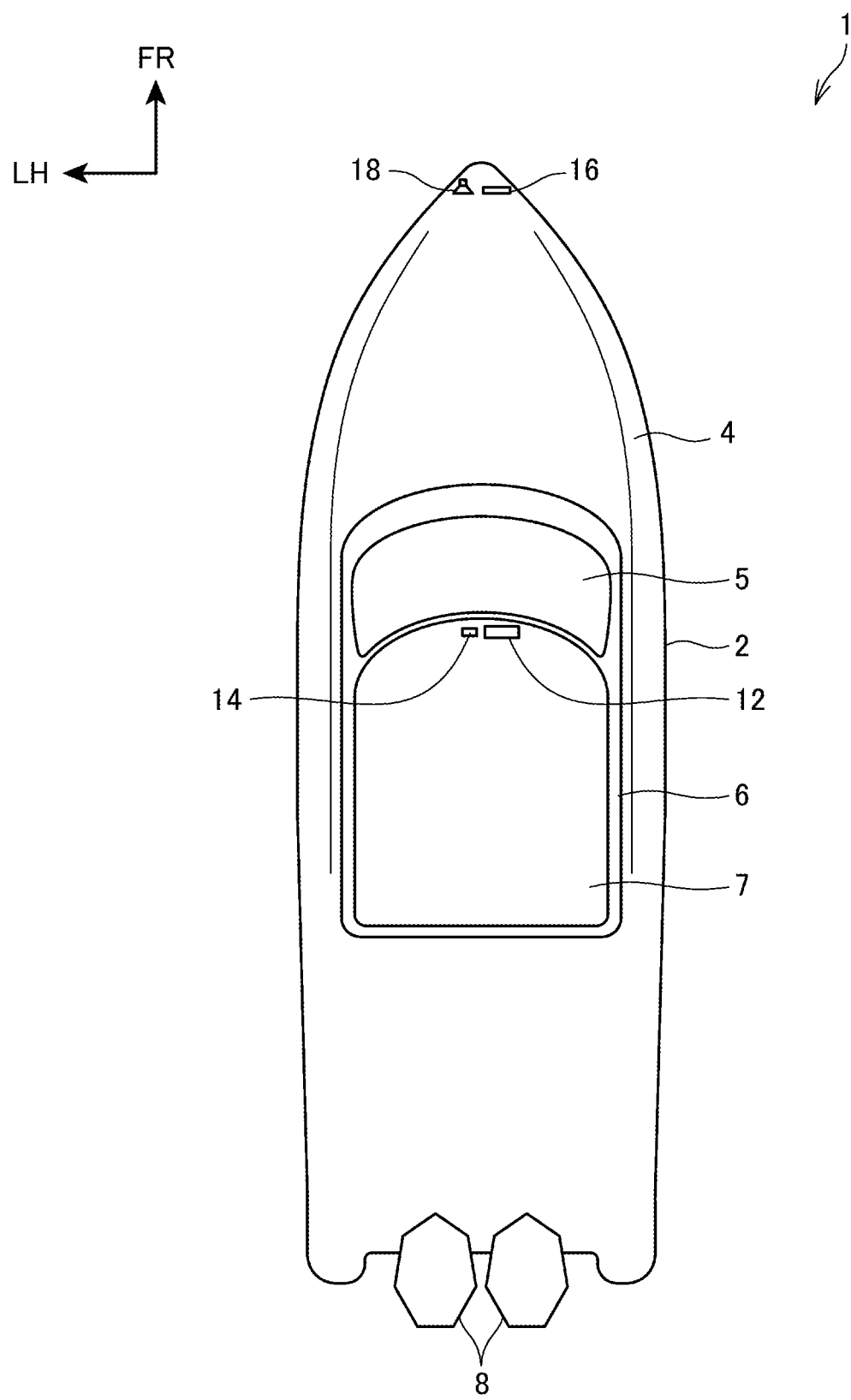
FIG. 2 is a plan view of the ship.

FIG. 1 is a side view of a ship 1 relating to the embodiment of the present invention. FIG. 2 is a plan view of the ship 1. In FIG. 1 and FIG. 2, a sign FR indicates a front part of the ship 1 in a state capable of navigation on the water, a sign UP indicates an upper part of the ship 1, and a sign LH indicates a left part of the ship 1. In the following explanation, unless otherwise explained, the individual directions are directions along the directions of the ship.

As illustrated in FIG. 1 and FIG. 2, the ship 1 includes a hull 2 and a deck 4 which covers an upper surface of the hull 2. In a planar view of the hull 2, a cabin 6 is provided on a rough center in a front-back direction of the ship 1. The cabin 6 is, as illustrated in FIG. 2, a structure roughly in a box shape formed by being projected upward to a predetermined height from the deck 4. In front of the cabin 6, a control cabin 5 is provided. That is, a front side of the cabin 6 functions as a so-called bridge. The cabin 6 includes a ceiling part 7 forming a top surface of the cabin 6. The ceiling part 7 is positioned above the deck 4.

At rear of the hull 2, an outboard motor 8 which functions as a propulsion engine of the ship 1 is provided. In the present embodiment, the ship 1 is provided with a pair of outboard motors 8 on a rear end of the hull 2.

Figure 3:
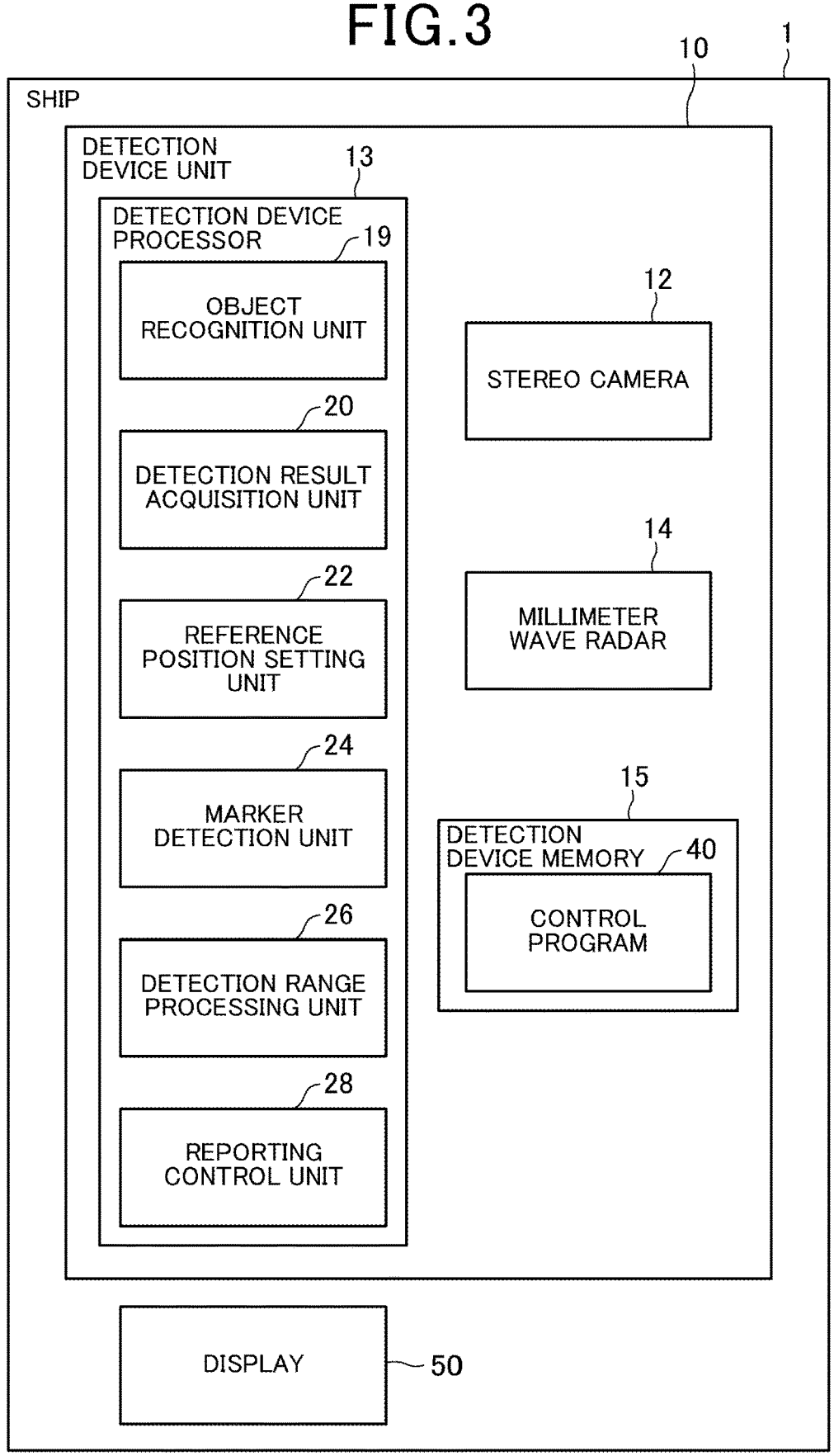
FIG. 3 is a block diagram of a detection device.

The ship 1 is provided with a detection device unit 10. The detection device unit 10 detects a state of the ship 1 and an object or a target positioned around the ship 1 using a predetermined detection device. The detection device unit 10 includes a camera 12, a millimeter wave radar 14, a detection device processor 13 (FIG. 3), and a detection device memory 15 (FIG. 3).

Figure 4:
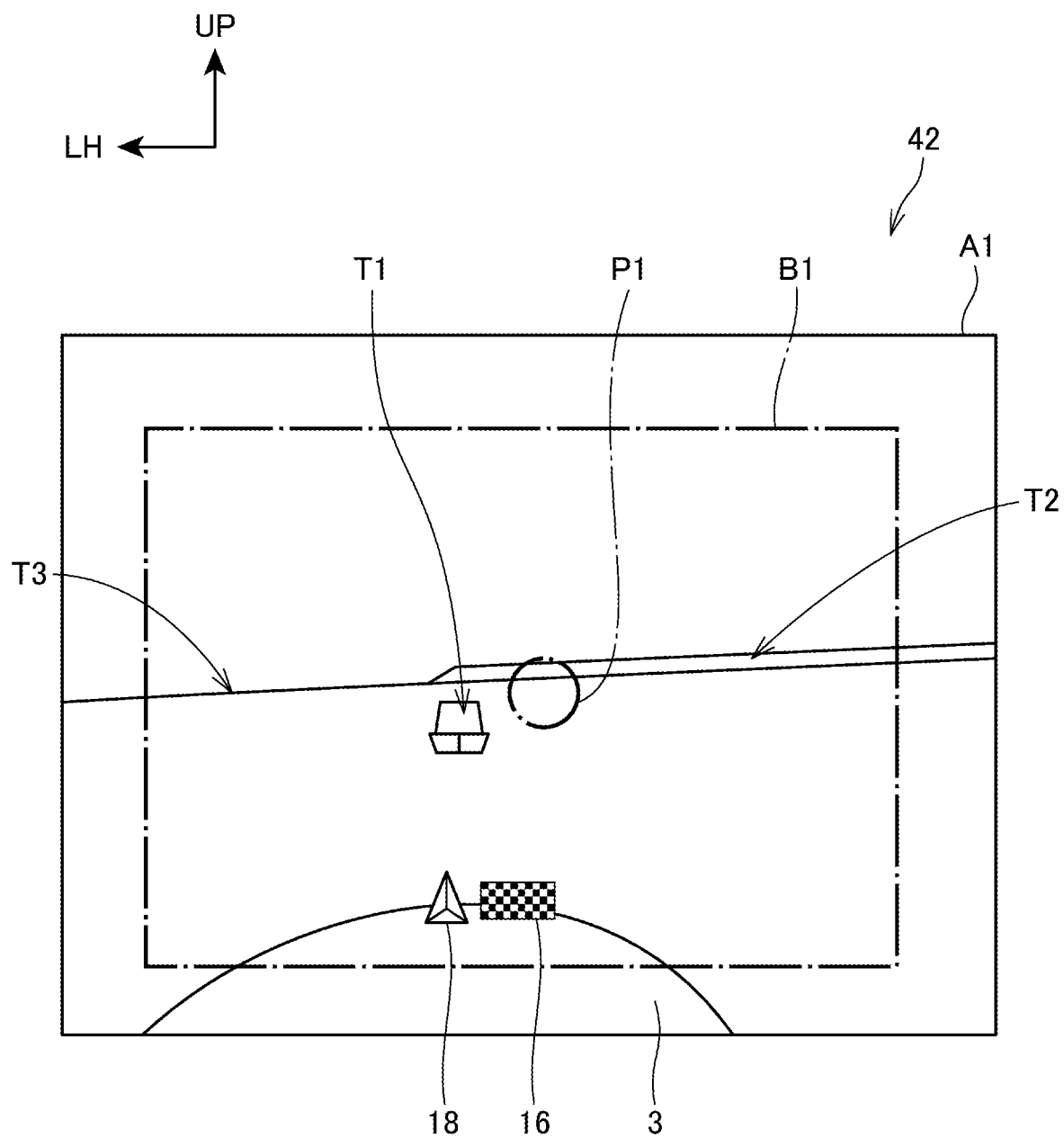
FIG. 4 is a diagram illustrating calibration of a camera by a detection device processor.

The camera 12 functions as a photographing device which photographs the front side of the ship 1. In the present embodiment, the camera 12 is a so-called stereo camera for which two lenses are arranged in a line on a front surface of a casing. Hereinafter, a range that the camera 12 can photograph is referred to as a photographing range A1 (FIG. 4).

The millimeter wave radar 14 functions as a radio wave sensor which detects a target or an object in front of the ship 1 and measures a distance to the target or the object by irradiating a predetermined range in front of the ship 1 with millimeter waves. Hereinafter, a range that the millimeter wave radar 14 can detect is referred to as a radar detection range.

The camera 12 and the millimeter wave radar 14 correspond to a "detection device" of the present disclosure. The photographing range A1 and the radar detection range correspond to a "detection range" of the present disclosure.

The camera 12 and the millimeter wave radar 14 are both provided on the upper surface of the ceiling part 7 of the cabin 6. Thus, the camera 12 and the millimeter wave radar 14 are arranged above the hull 2 including the deck 4 and behind a bow 3 of the hull 2. Therefore, the camera 12 and the millimeter wave radar 14 can include the bow 3 in each of the photographing range A1 and the radar detection range, and the detection device unit 10 can detect a state of the bow 3.

On the upper surface of the ceiling part 7 of the cabin 6, the camera 12 and the millimeter wave radar 14 are both provided on the front side. Thus, the camera 12 and the millimeter wave radar 14 vibrate less compared to a case where they are provided on the hull 2 including the deck 4, and a risk that waves and floating objects are brought into contact is reduced. Therefore, for the camera 12 and the millimeter wave radar 14, installation position aberration, breakage and dirt or the like are suppressed, and decline of a detection function is suppressed.

In the present embodiment, the camera 12 and the millimeter wave radar 14 are arranged in a line along a left-right direction of the ship 1.

In the present embodiment, the camera 12 and the millimeter wave radar 14 are both attached to the ceiling part 7 via leg parts. Each of the leg parts supports the camera 12 and the millimeter wave radar 14 so as to adjust a turning direction of the lens of the camera 12 and a millimeter wave irradiation direction of the millimeter wave radar 14. A user can adjust the directions of the camera 12 and the millimeter wave radar 14 by operating the leg parts.

At the bow 3 of the ship 1, a marker board 16 and a corner reflector 18 are provided on the upper surface of the deck 4. In the present embodiment, the marker board 16 and the corner reflector 18 are arranged at a so-called prow which is a position close to a distal end of the bow 3. The marker board 16 and the corner reflector 18 are arranged in a line along the left-right direction of the ship 1.

The marker board 16 is a planar member which functions as a so-called calibration tool of the camera 12. The marker board 16 is arranged such that one plane faces a front surface of the cabin 6. On the plane, a marker 17 to be a calibration target is drawn. In the present embodiment, the marker 17 is a so-called checkerboard pattern (FIG. 4).

Note that the ship 1 may include a three-dimensional object such as a spherical body and a rectangular parallelepiped body or a wand or the like as the calibration tool without being limited to the marker board 16. In addition, the marker 17 is not limited to the checkerboard pattern and may be anything such as a circle, a cross and an AR marker as long as a feature point corresponding to a predetermined point on space can be recognized as a point on a photographed image of the camera 12.

The corner reflector 18 is a member which functions as a so-called calibration tool of the millimeter wave radar 14. The corner reflector 18 reflects light or radio waves in a predetermined direction at a predetermined RCS (Radar Cross Section) value. That is, the corner reflector 18 is formed so as to reflect the millimeter waves irradiated from the millimeter wave radar 14. The corner reflector 18 is arranged so as to face a front end of the ceiling part 7. Note that the ship 1 may be provided with any calibration tool without being limited to the corner reflector 18, as long as it reflects the millimeter waves with a predetermined characteristic such as the predetermined RCS value or a predetermined wavelength.

The marker 17 and the corner reflector 18 correspond to a "marker" of the present disclosure.

In this way, by arranging the marker board 16 and the corner reflector 18 on the deck 4, the ship 1 is provided with the marker board 16 and the corner reflector 18 as fittings of the ship 1 together with the camera 12 and the millimeter wave radar 14. Thus, in the ship 1, the marker board 16 and the corner reflector 18 are arranged at predetermined positions to the camera 12 and the millimeter wave radar 14 regardless of shaking of the ship 1 due to waves and an installation state of the ship 1. Therefore, in the ship 1, calibration of the camera 12 or the millimeter wave radar 14 can be performed using the marker board 16 or the corner reflector 18 regardless of the shaking of the ship 1 due to waves and the installation state of the ship 1.

In addition, the marker board 16 and the corner reflector 18 are calibration instruments suitably used for detection of the camera 12 and the millimeter wave radar 14 respectively. Therefore, the detection device unit 10 can more surely and accurately perform the calibration compared to the case where an existing fitting such as a mast is a marker.

Further, on the deck 4, the marker board 16 and the corner reflector 18 are arranged at the position close to the distal end of the bow 3. Thus, on the upper surface of the deck 4 on the front side of the cabin 6, the marker board 16 and the corner reflector 18 are arranged at a position most away from the camera 12 and the millimeter wave radar 14. Therefore, in the ship 1, the detection device unit 10 can process a wider range on the front side of the ship 1 while including the bow 3 in each of the photographing range A1 and the radar detection range.

FIG. 3 is a block diagram illustrating a functional configuration of the detection device unit 10.

The detection device processor 13 included in the detection device unit 10 is a processor such as a CPU (Central Processing Unit) and an MPC (Micro Processing Unit). The detection device processor 13 realizes individual functional units illustrated in FIG. 3 by reading and executing a control program 40 stored in the detection device memory 15.

Note that, for the detection device processor 13, an arbitrary computer including a processor capable of executing the control program 40 can be used. In addition, some or all of the functional units may be configured by exclusive hardware.

The detection device memory 15 is a storage unit which stores a program and data. The detection device memory 15 includes a nonvolatile storage area and stores the control program 40 for realizing the individual functional units of the detection device processor 13.

The detection device memory 15 includes a volatile storage area and functions also as a so-called working memory which temporarily stores various kinds of information and data. For example, the detection device memory 15 temporarily stores images photographed by the camera 12, detection data of the millimeter wave radar 14 and data and information generated by processing of the detection device processor 13.

In the present embodiment, the detection device processor 13 and the detection device memory 15 are provided integrally with the camera 12. Without being limited thereto, the detection device processor 13 and the detection device memory 15 may be provided integrally with the millimeter wave radar 14. Further, a processor which is provided on the ship 1 and controls the outboard motors 8 or the like for example and a memory may include functions of the detection device processor 13 and the detection device memory 15. In addition, for example, the detection device processor 13 and the detection device memory 15 may be provided in a device provided independent of the ship 1, such as a terminal device like a tablet that the user can carry and a processor installed outside the ship 1.

As illustrated in FIG. 3, the detection device processor 13 includes an object recognition unit 19, a detection result acquisition unit 20, a reference position setting unit 22, a marker detection unit 24, a detection range processing unit 26 and a reporting control unit 28.

The object recognition unit 19 performs recognition of an object or a target in front of the ship 1 and the bow 3 or the like and measurement of a distance between the object or the target and the ship 1 or the like, based on the image of the camera 12 and the detection data of the millimeter wave radar 14.

The detection result acquisition unit 20 acquires the image photographed by the camera 12 and the detection data of the millimeter wave radar 14.

FIG. 4 is a diagram illustrating the calibration of the camera 12 by the detection device processor 13. In FIG. 4, a sign UP indicates the upper part in an image 42, and a sign LH indicates the left part in the image 42. Note that, in FIGS. 4, T1, T2 and T3 are objects photographed in the image 42 by the camera 12, T1 is another ship positioned in front of the ship 1, T2 is a land positioned in front of the ship 1, and T3 is a horizontal line positioned in front of the ship 1.

The reference position setting unit 22 sets a radar reference point to the image acquired by the detection result acquisition unit 20 and the detection data of the millimeter wave radar 14.

Specifically, as illustrated in FIG. 4, when the detection result acquisition unit 20 acquires the image 42 which is an example of the image, the reference position setting unit 22 sets a reference point P1 to the image 42. For the image 42, the entire photographing range A1 of the camera 12 is photographed. That is, in the detection device processor 13, the photographing range A1 is processed as a rectangular plane as illustrated by the image 42. In the present embodiment, the reference position setting unit 22 recognizes an outer edge of a rectangle of the photographing range A1 and arranges the reference point P1 at a rough center of the photographing range A1. In other words, the reference point P1 is arranged at the rough center in the up-down direction of the photographing range A1 and the rough center in the left-right direction of the photographing range A1.

Also when the detection result acquisition unit 20 acquires the detection data of the millimeter wave radar 14, the reference position setting unit 22 sets the radar reference point to the detection data. The detection data corresponds to the radar detection range of the millimeter wave radar 14. In the present embodiment, the reference position setting unit 22 recognizes the radar detection range and sets the radar reference point at a predetermined position of the radar detection range.

The marker detection unit 24 determines whether or not the marker 17 is photographed in the image acquired by the detection result acquisition unit 20. Similarly, the marker detection unit 24 determines whether or not the corner reflector 18 is detected in the detection data acquired by the detection result acquisition unit 20.

When the detection result acquisition unit 20 acquires the image, as illustrated in FIG. 4, the marker detection unit 24 determines whether or not the marker 17 is captured in the image 42. In the present embodiment, the marker detection unit 24 detects the marker 17 as the feature point and determines that the marker 17 is captured in the image 42. In the present embodiment, since the marker 17 is the checkerboard pattern, when the marker 17 is captured in the image, each intersection position of black and white squares of the marker 17 is detected by the marker detection unit 24 as marker coordinates, that is, the feature point.

Also when the detection result acquisition unit 20 acquires the detection data of the millimeter wave radar 14, the marker detection unit 24 determines whether or not a reflected wave of the corner reflector 18 is recorded in the data acquired by the detection result acquisition unit 20. When the reflected wave of the corner reflector 18 is recorded, the marker detection unit 24 detects a position where the reflected wave is recorded as the feature point, and determines that the corner reflector 18 is detected in the detection data.

When it is determined that the marker 17 is photographed in the image acquired by the detection result acquisition unit 20, the marker detection unit 24 measures the distance between the reference point P1 and the marker 17 in the photographing range A1, and determines whether or not the distance is a predetermined value or shorter. Similarly, the marker detection unit 24 measures the distance between the radar reference point and the corner reflector 18 in the detection data acquired by the detection result acquisition unit 20, and determines whether or not the distance is the predetermined value or shorter.

For example, as illustrated in FIG. 4, when it is determined that the marker 17 is photographed in the image 42 acquired by the detection result acquisition unit 20, the marker detection unit 24 measures the distance between the reference point P1 and the marker 17 and determines whether or not the distance is the predetermined value or shorter.

When the marker detection unit 24 determines that the distance between the reference point P1 and the marker 17 in the photographing range A1 is the predetermined value or shorter, the detection range processing unit 26 sets a processing range B1 with the reference point P1 as the reference inside the photographing range A1. Similarly, when the distance between the radar reference point and the corner reflector 18 in the detection data is measured and the marker detection unit 24 determines that the distance is the predetermined value or shorter, the detection range processing unit 26 sets a radar processing range with the radar reference point as the reference inside the radar detection range.

Both of the processing range B1 and the radar processing range are ranges which surely keep the predetermined range in front of the ship 1 and the bow 3 on an inner side and are detectable by the object recognition unit 19.

The processing range B1 and the radar processing range correspond to a "processing range" of the present disclosure.

As illustrated in FIG. 4, when the marker detection unit 24 determines that the distance between the reference point P1 and the marker 17 in the photographing range A1 is the predetermined value or shorter, the detection range processing unit 26 sets the processing range B1 in a rectangular shape on the inner side of the photographing range A1. In the processing range B1, the reference point P1 is positioned at the rough center.

When the distance between the radar reference point and the corner reflector 18 in the detection data is measured and the marker detection unit 24 determines that the distance is the predetermined value or shorter, the detection range processing unit 26 sets the radar processing range on the inner side of the radar detection range. At the predetermined position on the inner side of the radar processing range, the radar reference point is positioned.

The processing range B1 and the radar processing range set in this way are both stored in the detection device memory 15. When the processing range B1 and the radar processing range are stored in the detection device memory 15, the object recognition unit 19 recognizes an object or a target and the bow 3 or the like only on the inner side of the processing range B1 and the radar processing range. Thus, in the ship 1, the calibration of the camera 12 and the millimeter wave radar 14 is performed and the front of the ship 1 and the bow 3 can be more surely detected.

When the marker detection unit 24 determines that the marker 17 is not photographed in the image or the corner reflector 18 is not detected in the detection data, the reporting control unit 28 performs reporting to the user via various kinds of output devices provided on the ship 1.

Similarly, when it is determined that the distance between the reference point P1 and the marker 17 is not the predetermined value or shorter or the distance between the radar reference point and the corner reflector 18 is not the predetermined value or shorter, the reporting control unit 28 performs the reporting to the user via various kinds of output devices provided on the ship 1.

The reporting urges the user to adjust the turning direction of the lens of the camera 12 or the millimeter wave irradiation direction of the millimeter wave radar 14.

The output devices are, for example, reporting devices like various kinds of display devices and sound output devices such as a speaker provided on a predetermined part of the ship. In the present embodiment, the reporting control unit 28 makes a display 50 provided in the control cabin 5 display a predetermined report.

Note that, without being limited thereto, the output device may be provided in a terminal device like a tablet that the user can carry.

Thus, in the ship 1, the camera 12 and the millimeter wave radar 14 are suppressed from performing the detection of the range inappropriate for detecting the front of the ship 1 and the bow 3. Therefore, in the ship 1, the calibration of the camera 12 and the millimeter wave radar 14 is performed and the front of the ship 1 and the bow 3 can be more surely detected.

In the present embodiment, the calibration of the camera 12 and the millimeter wave radar 14 is performed when the ship 1 is arranged at a dock or on land or moored on the water or the like. The calibration is desirably performed after it is confirmed by the user that the camera 12 and the millimeter wave radar 14 are not in the state that invites decline of detection accuracy of the marker, such as dirt adhesion and a fault.

Note that the calibration of the camera 12 and the millimeter wave radar 14 may be performed at every interval of predetermined time during the navigation of the ship 1.

Figure 5:
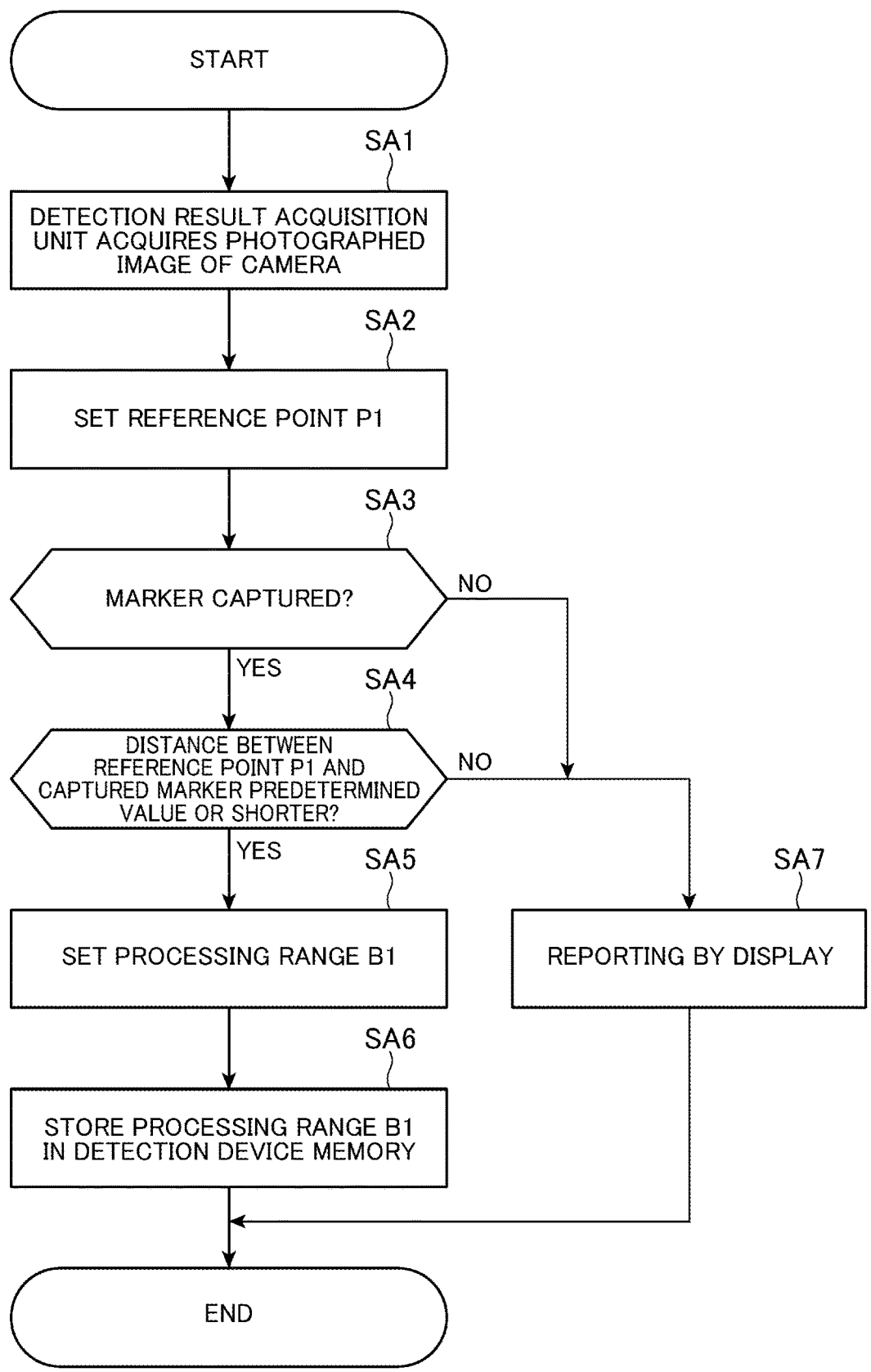
FIG. 5 is a flowchart illustrating an operation relating to the calibration of the camera.

FIG. 5 is a flowchart illustrating an operation relating to the calibration of the camera 12.

In the ship 1, when performing the calibration of the camera 12, the detection result acquisition unit 20 acquires the image photographed by the camera 12 first (step SA1).

Then, at the predetermined position of the image acquired by the detection result acquisition unit 20, the reference position setting unit 22 sets the reference point P1 (step SA2).

Next, the marker detection unit 24 determines whether or not the marker 17 is photographed in the image acquired by the detection result acquisition unit 20 (step SA3).

When it is determined that the marker 17 is photographed in the image acquired by the detection result acquisition unit 20 (step SA3: YES), the marker detection unit 24 measure the distance between the reference point P1 and the marker 17, and determines whether or not the distance is the predetermined value or shorter (step SA4).

When it is determined that the distance is the predetermined value or shorter (step SA4: YES), the detection range processing unit 26 sets the processing range B1 with the reference point P1 as the reference. Thereafter, the detection range processing unit 26 stores the processing range B1 in the detection device memory 15 (step SA6). Thus, the calibration of the camera 12 is performed.

When the marker detection unit 24 determines that the marker 17 is not photographed in the image acquired by the detection result acquisition unit 20 in step SA3 (step SA3: NO), the reporting control unit 28 makes the display 50 display the report which urges the user to adjust an arrangement position and an installation angle of the camera 12.

Similarly, when the marker detection unit 24 determines that the distance between the reference point P1 and the marker 17 is not the predetermined value or shorter in step SA4 (step SA4: NO), the reporting control unit 28 makes the display 50 display the report which urges the user to adjust the arrangement position and the installation angle of the camera 12.

Figure 6:
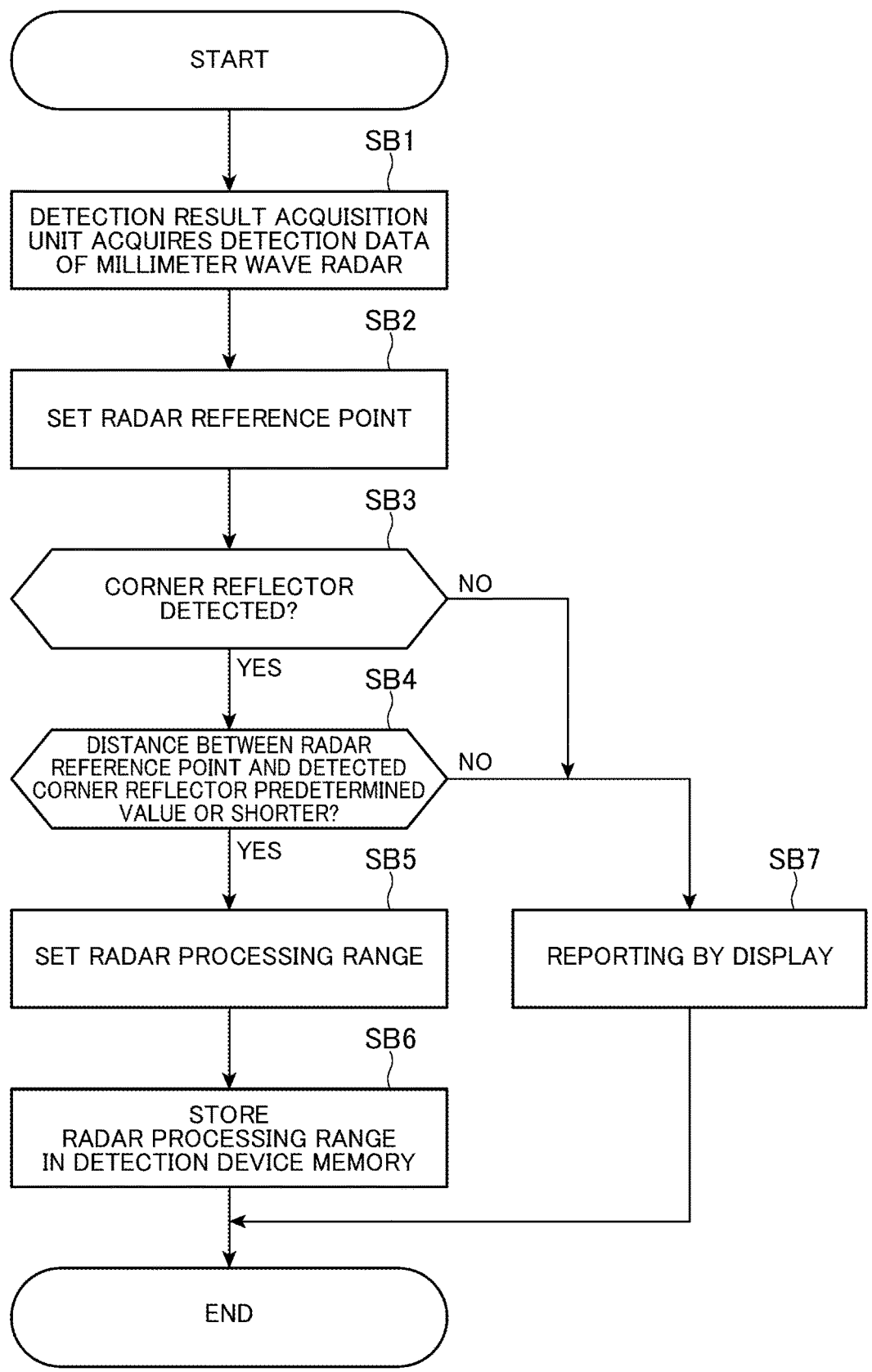
FIG. 6 is a flowchart illustrating the operation relating to the calibration of a millimeter wave radar.

FIG. 6 is a flowchart illustrating the operation relating to the calibration of the millimeter wave radar 14.

In the ship 1, when performing the calibration of the millimeter wave radar 14, the detection result acquisition unit 20 acquires the detection data detected by the millimeter wave radar 14 first (step SB1).

Then, at the predetermined position of the detection data acquired by the detection result acquisition unit 20, the reference position setting unit 22 sets the radar reference point (step SB2).

Next, the marker detection unit 24 determines whether or not the corner reflector 18 is detected in the detection data acquired by the detection result acquisition unit 20 (step SB3).

When it is determined that the corner reflector 18 is detected in the detection data acquired by the detection result acquisition unit 20 (step SB3: YES), the marker detection unit 24 measures the distance between the radar reference point and the corner reflector 18, and determines whether or not the distance is the predetermined value or shorter (step SB4).

When it is determined that the distance is the predetermined value or shorter (step SB4: YES), the detection range processing unit 26 sets the radar processing range with the radar reference point as the reference.

Thereafter, the detection range processing unit 26 stores the radar processing range in the detection device memory 15 (step SB6). Thus, the calibration of the millimeter wave radar 14 is performed.

When the marker detection unit 24 determines that the corner reflector 18 is not detected in the detection data acquired by the detection result acquisition unit 20 in step SB3 (step SB3: NO), the reporting control unit 28 makes the display 50 display the report which urges the user to adjust the arrangement position and the installation angle of the millimeter wave radar 14.

Similarly, when the marker detection unit 24 determines that the distance between the radar reference point and the corner reflector 18 is not the predetermined value or shorter in step SB4 (step SB4: NO), the reporting control unit 28 makes the display 50 display the report which urges the user to adjust the arrangement position and the installation angle of the millimeter wave radar 14.

As explained above, according to the present embodiment, the ship 1 includes the camera 12 and the millimeter wave radar 14 which detect the predetermined range positioned in front of the ship 1. The camera 12 and the millimeter wave radar 14 are provided on the cabin 6 erected above the deck 4 of the ship 1, and also provided on the part positioned on the side of the bow 3 of the cabin 6.

Thus, the camera 12 and the millimeter wave radar 14 vibrate less compared to the case where they are provided on the hull 2 including the deck 4, and the risk that waves and floating objects are brought into contact is reduced. Therefore, for the camera 12 and the millimeter wave radar 14, installation position aberration, breakage and dirt or the like are suppressed, and the decline of the detection function is suppressed.

In addition, according to the present embodiment, the camera 12 and the millimeter wave radar 14 are provided on the ceiling part 7 of the cabin 6.

Thus, the camera 12 and the millimeter wave radar 14 are arranged above the hull 2 including the deck 4 and also behind the bow 3 of the hull 2. Therefore, the camera 12 and the millimeter wave radar 14 can include the bow 3 in each of the photographing range A1 and the radar detection range, and the detection device unit 10 can detect the state of the bow 3.

Further, according to the present embodiment, the marker 17 and the corner reflector 18 are provided on the deck 4. The camera 12 and the millimeter wave radar 14 detect the marker 17 and the corner reflector 18, and detect an object present on the inner side of the processing range B1 and the radar processing range that are the predetermined ranges with the marker 17 and the corner reflector 18 as the reference.

Thus, in the ship 1, the marker board 16 and the corner reflector 18 are arranged at the predetermined positions to the camera 12 and the millimeter wave radar 14 regardless of the shaking of the ship 1 due to waves and the installation state of the ship 1. Therefore, in the ship 1, the calibration of the camera 12 or the millimeter wave radar 14 can be performed using the marker board 16 or the corner reflector 18 regardless of the shaking of the ship 1 due to waves and the installation state of the ship 1.

Furthermore, according to the present embodiment, the marker 17 and the corner reflector 18 are provided on the position close to the bow 3 of the deck 4.

Thus, on the upper surface of the deck 4 on the front side of the cabin 6, the marker board 16 and the corner reflector 18 are arranged at the position most away from the camera 12 and the millimeter wave radar 14. Therefore, in the ship 1, the detection device unit 10 can process a wider range on the front side of the ship 1 while including the bow 3 in each of the photographing range A1 and the radar detection range.

Further, according to the present embodiment, when the marker detection unit 24 determines that the marker 17 and the corner reflector 18 are separated from the reference point P1 and the radar reference point by the predetermined value or less, the detection range processing unit 26 sets the processing range B1 and the radar processing range.

Thus, in the ship 1, the calibration of the camera 12 and the millimeter wave radar 14 is performed. Therefore, the camera 12 and the millimeter wave radar 14 can more surely detect the front of the ship 1 and the bow 3.

Still further, according to the present embodiment, when the marker detection unit 24 determines that the marker 17 and the corner reflector 18 are separated from the reference point P1 and the radar reference point by the predetermined value or more, the reporting control unit 28 makes the display 50 perform the reporting.

Thus, in the ship 1, the camera 12 and the millimeter wave radar 14 are suppressed from performing the detection of the range inappropriate for detecting the front of the ship 1 and the bow 3. Therefore, in the ship 1, the calibration of the camera 12 and the millimeter wave radar 14 is performed and the front of the ship 1 and the bow 3 can be more surely detected.

Yet further, according to the present embodiment, when the marker detection unit 24 determines that the marker 17 and the corner reflector 18 are not detected, the reporting control unit 28 makes the display 50 perform the reporting.

Thus, in the ship 1, the camera 12 and the millimeter wave radar 14 are suppressed from performing the detection of the range inappropriate for detecting the front of the ship 1 and the bow 3. Therefore, in the ship 1, the calibration of the camera 12 and the millimeter wave radar 14 is performed and the front of the ship 1 and the bow 3 can be more surely detected.

The embodiment described above exemplifies one mode of the present invention and arbitrary modifications and applications are possible without deviating from the gist of the present invention.

For example, the marker detection unit 24 may determine performance of the camera 12 and the millimeter wave radar 14 which are the detection devices by determining whether or not recognition intensity of the marker is the predetermined value or more.

Specifically, when the detection result acquisition unit 20 acquires the image, the marker detection unit 24 may determine a shape of the marker 17, after determining whether or not the marker 17 is captured in the image 42. In the determination, the marker detection unit 24 compares the detected shape of the marker 17 and the shape of the marker 17 stored in the detection device memory 15. Then, when there are a predetermined number or more of matching points of the shapes, the marker detection unit 24 determines that the marker 17 is normally detected, that is, the performance of the camera 12 is normal.

On the other hand, when there are the predetermined number or less of the matching points of the detected shape of the marker 17 and the shape of the marker 17 stored in the detection device memory 15, the marker detection unit 24 determines that the marker 17 is not normally detected, that is, the performance of the camera 12 is abnormal. When there are the predetermined number or less of the matching points, it is assumed that the decline of a photographing function is caused in the camera 12 due to a fault or dirt adhesion to the lens or the like.

When it is determined that the performance of the camera 12 is abnormal, the reporting control unit 28 makes the display 50 display the report indicating that the photographing function of the camera 12 is abnormal.

Similarly, when the detection result acquisition unit 20 acquires the detection data of the millimeter wave radar 14, the marker detection unit 24 may determine whether or not radio wave intensity reflected from the corner reflector 18 is the predetermined value or more, after determining whether or not the corner reflector 18 is detected in the detection data. In the determination, the marker detection unit 24 compares the detected radio wave intensity and the predetermined value of the radio wave intensity stored in the detection device memory 15. Then, when the detected radio wave intensity is the predetermined value or more, the marker detection unit 24 determines that the corner reflector 18 is normally detected, that is, the performance of the millimeter wave radar 14 is normal.

On the other hand, when the detected radio wave intensity is the predetermined value or less, the marker detection unit 24 determines that the corner reflector 18 is not normally detected, that is, the performance of the millimeter wave radar 14 is abnormal. When the detected radio wave intensity is the predetermined value or less, it is assumed that the decline of the detection function is caused in the millimeter wave radar 14 due to a fault or dirt adhesion to a sensor or the like.

When it is determined that the performance of the millimeter wave radar 14 is abnormal, the reporting control unit 28 makes the display 50 display the report indicating that the detection function of the millimeter wave radar 14 is abnormal.

The number of the matching points of the shapes between the detected shape of the marker 17 and the shape of the marker 17 stored in the detection device memory 15 and the radio wave intensity reflected from the corner reflector 18 described above correspond to "recognition intensity" of the present disclosure. In addition, the report indicating that the detection function of the camera 12 or the millimeter wave radar 14 is abnormal described above corresponds to "first reporting contents" of the present disclosure.

Thus, when the decline of the function is caused in the camera 12 and the millimeter wave radar 14 due to a fault or dirt adhesion, the detection device unit 10 can report the performance decline of the camera 12 and the millimeter wave radar 14 to the user. Therefore, the detection device unit 10 can urge the user to perform the processing of restoring the performance of the camera 12 and the millimeter wave radar 14.

Note that the above-described determination of the performance of the camera 12 and the millimeter wave radar 14 may be executed by other predetermined functional units provided in the detection device unit 10, without being limited to the marker detection unit 24.

In addition, for example, when the detection result acquisition unit 20 acquires the image, the marker detection unit 24 may detect the plurality of feature points of the marker 17 and determine that the marker 17 is normally detected when the predetermined value or more of the feature points are detected.

Also, for example, the detection device unit 10 may include an image processing unit, detect a contour of the marker board 16 or an object photographed in the image 42 as a boundary, and determine the performance of the camera 12 and the millimeter wave radar 14 by having the image processing unit determine the intensity of blurring of the boundary.

Further, the marker detection unit 24 may determine whether or not the recognition intensity of the marker is the predetermined value or more after the reporting control unit 28 makes the display 50 display the report indicating that the function of the camera 12 or the millimeter wave radar 14 is abnormal.

Then, when it is determined that the performance of the camera 12 or the millimeter wave radar 14 is normal, the reporting control unit 28 may make the display 50 display the report indicating that the performance of the camera 12 or the millimeter wave radar 14 is normal.

Thus, the detection device unit 10 can report to the user that the performance of the camera 12 and the millimeter wave radar 14 is restored by the processing of restoring the performance of the camera 12 and the millimeter wave radar 14 by the user such as dirt wiping-off or the like. Therefore, the detection device unit 10 can report the state of the camera 12 and the millimeter wave radar 14 to the user in more detail.

The above-described report indicating that the performance of the camera 12 or the millimeter wave radar 14 is normal corresponds to "second reporting contents" of the present disclosure.

Note that, after the reporting control unit 28 makes the display 50 display the report indicating that the function of the camera 12 or the millimeter wave radar 14 is abnormal, the marker detection unit 24 may execute the determination of whether or not the recognition intensity of the marker is the predetermined value or more for two or more times at a predetermined interval. In addition, for example, the user may make the detection device unit 10 execute the determination of whether or not the recognition intensity of the marker is the predetermined value or more by the marker detection unit 24, via a controller or the like.

While the camera 12 and the millimeter wave radar 14 are provided on the cabin 6 in the embodiment described above, without being limited thereto, they may be provided on anything as long as it is a structure projected above the deck 4, such as a floating wing and a mast.

While the marker board 16 and the corner reflector 18 are provided on the deck 4 in the embodiment described above, without being limited thereto, they may be provided on a structure projected above the deck 4, such as a handrail.

While the ship 1 includes the two detection devices of the camera 12 and the millimeter wave radar 14 in the embodiment described above, without being limited thereto, the ship 1 may include one, or three or more detection devices.

While the ship 1 includes the millimeter wave radar 14 in the embodiment described above, without being limited thereto, the ship 1 may include other radio wave sensors and optical sensors such as an ultrasonic radar and a LIDAR (Light Detection and Ranging) instead of the millimeter wave radar 14.

Step units of the operations illustrated in FIG. 5 and FIG. 6 are divided according to main processing contents in order to facilitate understanding of the operations, and the operations are not limited by a division method or names of processing units. Division into more step units may be performed according to the processing contents. In addition, the division may be performed so that one step unit includes more processing. Further, an order of the steps may be appropriately changed without obstructing the gist of the present invention.

The detection device processor 13 may be configured by a single processor or may be configured by a plurality of processors. The detection device processor 13 may be hardware programmed so as to realize the corresponding functional units. That is, the detection device processor 13 is configured by an ASIC (Application Specific Integrated Circuit) or an FPGA (Field Programmable Gate Array).

The control program 40 executed by the detection device processor 13 can be realized in the state of recording the control program 40 in a portable information recording medium. Examples of the information recording medium are a magnetic recording medium such as a hard disk, an optical recording medium such as a CD and a semiconductor storage device such as a USB (Universal Serial Bus) memory and an SSD (Solid State Drive), and the other recording medium can be also used.

The directions, various kinds of numerical values and the shapes described in the embodiment described above include a so-called equal range which accomplishes same effects as the directions, the numerical values and the shapes, unless otherwise mentioned.

[Configurations Supported by Embodiment Described Above]

The embodiments described above support the following configurations.

(Configuration 1) A detection device which is provided on a ship and detects a predetermined range positioned in front of the ship, the detection device being provided on a structure erected above a deck of the ship and being provided on a part positioned on a bow side of the structure.

According to the configuration, the detection device vibrates less compared to the case where it is provided on a hull including the deck and the risk that waves and floating objects are brought into contact is reduced. Therefore, for the detection device, installation position aberration, breakage and dirt or the like are suppressed, and the decline of the detection function is suppressed.

(Configuration 2) The detection device according to configuration 1, the detection device being provided on a part positioned above the structure.

According to the configuration, the detection device is arranged above the hull including the deck and behind the bow of the hull. Therefore, the detection device can include the bow in each detection range and the detection device can detect the state of the bow.

(Configuration 3) The detection device according to configuration 1 or configuration 2, wherein a marker is provided on the deck, the detection device detecting the marker and detecting an object present on an inner side of a processing range which is a predetermined range with the marker as a reference.

According to the configuration, in the ship, the marker is arranged at the predetermined position to the detection device regardless of the shaking of the ship due to waves and the installation state of the ship. Therefore, in the ship, the calibration of the detection device can be performed using the marker regardless of the shaking of the ship due to waves and the installation state of the ship.

(Configuration 4) The detection device according to configuration 3, wherein the marker is provided at a position close to the bow of the deck.

According to the configuration, the marker is arranged at the position most away from the detection device on the upper surface of the deck on the front side of the structure. Therefore, in the ship, the detection device can process a wider range on the front side of the ship while including the bow in each detection range.

(Configuration 5) The detection device according to configuration 3 or configuration 4, the detection device setting the processing range when it is determined that the marker is separated by a predetermined value or less from a predetermined position of a detection range which is a range detectable by the detection device.

According to the configuration, in the ship, the calibration of the detection device is performed. Therefore, the detection device can more surely detect the front of the ship and the bow.

(Configuration 6) The detection device according to any one of configuration 3 to configuration 5, the detection device making a reporting device perform reporting when it is determined that the marker is separated by a predetermined value or more from a predetermined position of a detection range which is a range detectable by the detection device.

According to the configuration, in the ship, the detection device is suppressed from performing the detection of the range inappropriate for detecting the front of the ship and the bow. Therefore, in the ship, the calibration of the detection device is performed and the front of the ship and the bow can be more surely detected.

(Configuration 7) The detection device according to configuration 6, the detection device making the reporting device perform reporting when the marker is not detected.

According to the configuration, in the ship, the detection device is suppressed from performing the detection of the range inappropriate for detecting the front of the ship and the bow. Therefore, in the ship, the calibration of the detection device is performed and the front of the ship and the bow can be more surely detected.

(Configuration 8) The detection device according to configuration 6, the detection device making the reporting device perform reporting when recognition intensity of the detected marker is a predetermined value or less.

According to the configuration, when the decline of the function is caused by a fault or dirt adhesion, the detection device can report the performance decline to the user. Therefore, the detection device can urge the user to perform the processing of restoring the performance of the detection device.

(Configuration 9) The detection device according to configuration 8, the detection device making the reporting device report first reporting contents when the recognition intensity of the detected marker is the predetermined value or less, and making the reporting device report second reporting contents when the recognition intensity of the detected marker is the predetermined value or more after the first reporting contents are reported by the reporting device.

According to the configuration, the detection device can report to the user that the performance is restored by the processing of restoring the performance by the user such as dirt wiping-off or the like. Therefore, the detection device can report the state of the detection device to the user in more detail.

REFERENCE SIGNS LIST 1 ship
2 hull
3 bow
4 deck
6 cabin
7 ceiling part
10 detection device unit
12 camera (detection device)
13 detection device processor
14 millimeter wave radar (detection device)
15 detection device memory
16 marker board
17 marker
18 corner reflector (marker)
50 display (reporting device)
A1 photographing range (detection range)
B1 processing range
P1 reference point (predetermined position)

What is claimed is:

1. A detection device which is provided on a ship and detects a predetermined range positioned in front of the ship, the detection device being provided on a structure erected above a deck of the ship and being provided on a part positioned on a bow side of the structure,
the detection device being configured to detect a detection range and a marker provided on the deck of the ship,
the detection device comprises a processor configured to execute a control program stored in a memory, execution of the control program causing the processor to, at every interval of predetermined time during navigation of the ship, set a reference point inside the detection range, set a processing range on an inner side of the detection range when the processor determines that the marker is separated by a predetermined value or less from the reference point, and recognize an object or a target inside the processing range.

2. The detection device according to claim 1, wherein the processor of the detection device, by executing the control program, makes a reporting device perform reporting when it is determined that the marker is separated by the predetermined value or more from the reference point.

3. The detection device according to claim 2, wherein the processor of the detection device, by executing the control program, makes the reporting device perform reporting when the marker is not detected.

4. The detection device according to claim 2, wherein the processor of the detection device, by executing the control program, makes the reporting device perform reporting when recognition intensity of the marker that is detected is a predetermined value or less.

5. The detection device according to claim 4, wherein the processor of the detection device, by executing the control program, makes the reporting device report first reporting contents when the recognition intensity of the marker is the predetermined value or less, and makes the reporting device report second reporting contents when the recognition intensity of the marker is the predetermined value or more after the first reporting contents are reported by the reporting device.

6. The detection device according to claim 1, wherein the detection device is provided on a part positioned above the structure.

7. The detection device according to claim 1, wherein wherein the marker is provided on the bow of the deck.

8. The detection device according to claim 1, wherein the detection device further comprises:
   a camera having a photographing range; and
   a millimeter wave radar having a radar detection range,
   wherein the detection range is the photographing range of the camera and the radar detection range of the millimeter wave radar.

\* \* \* \* \*